US011614992B2

(12) United States Patent
Efremov

(10) Patent No.: US 11,614,992 B2
(45) Date of Patent: *Mar. 28, 2023

(54) DETECTION OF SYSTEM ANOMALIES

(71) Applicant: AO Kaspersky Lab, Moscow (RU)

(72) Inventor: Andrey A. Efremov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

This patent is subject to a terminal disclaimer.

(21) Appl. No.: 17/392,311

(22) Filed: Aug. 3, 2021

(65) Prior Publication Data
US 2021/0365314 A1    Nov. 25, 2021

Related U.S. Application Data

(63) Continuation of application No. 16/429,172, filed on Jun. 3, 2019, now Pat. No. 11,113,143.

(30) Foreign Application Priority Data

Dec. 28, 2018    (RU) ................................ 2018147243

(51) Int. Cl.
G06F 11/07    (2006.01)
(52) U.S. Cl.
CPC ........ G06F 11/0793 (2013.01); G06F 11/079 (2013.01); G06F 11/0721 (2013.01); G06F 11/0751 (2013.01)
(58) Field of Classification Search
CPC ............. G06F 11/0721; G06F 11/0751; G06F 11/079; G06F 11/0793
See application file for complete search history.

(56) References Cited

U.S. PATENT DOCUMENTS

| 7,373,552 | B2 * | 5/2008 | Bjorsne | G06F 11/079 |
| | | | | 714/E11.026 |
| 8,166,348 | B1 * | 4/2012 | Kulkarni | G06F 11/3636 |
| | | | | 717/124 |
| 8,832,256 | B2 * | 9/2014 | DeHaan | G06F 11/0793 |
| | | | | 709/224 |
| 9,542,252 | B2 * | 1/2017 | Uchiumi | G06F 11/0751 |
| 9,552,249 | B1 | 1/2017 | James | |
| 9,772,898 | B2 * | 9/2017 | Deshpande | H04L 41/0631 |
| 2009/0299817 | A1 | 12/2009 | Fok et al. | |
| 2011/0107137 | A1 * | 5/2011 | Lam | G06F 11/0793 |
| | | | | 714/E11.023 |

(Continued)

FOREIGN PATENT DOCUMENTS

WO    WO-2018144011 A1 *  8/2018 .......... G06F 11/0709

*Primary Examiner* — Joseph R Kudirka
(74) *Attorney, Agent, or Firm* — ArentFox Schiff LLP; Michael Fainberg

(57) ABSTRACT

Systems and methods are provided for detecting system anomalies. The described technique includes receiving system parameters specifying functionality of a computing system. An anomaly is detected within the computing system. A recovery method is determined based on a recovery-method model and information about the detected anomaly, responsive to detecting the anomaly in the computing system. The determined recovery method is configured to ensure requirements of the computing system are met. Furthermore, responsive to detecting the anomaly in the computing system, the determined recovery method is implemented in response to installation of the selected system-compatible tool.

20 Claims, 7 Drawing Sheets

(56) References Cited

U.S. PATENT DOCUMENTS

2016/0350173 A1 12/2016 Rafiul
2018/0060752 A1 3/2018 Gross et al.
2018/0114271 A1 4/2018 Jhoney et al.

* cited by examiner

DETECTION OF SYSTEM ANOMALIES

CROSS-REFERENCE TO RELATED APPLICATIONS

This application is a continuation of prior U.S. patent application Ser. No. 16/429,172, filed Jun. 3, 2019, which claims benefit of priority under 35 U.S.C. 119(a)-(d) to a Russian Patent Application No. 2018147243 filed on Dec. 28, 2018, the entire contents of each of which is incorporated by reference herein.

FIELD OF TECHNOLOGY

The present disclosure relates to methods and systems for detection of system anomalies.

BACKGROUND

Companies and entrepreneurs resort to advertising services in order to promote their products. Advertising is a transmittal of information about goods and services or ideas of the advertiser through various media, being nonpersonalized, usually for pay, and having the nature of a persuasion. With the development of the Internet, advertising has also made inroads there; according to the latest data more than 20% of advertising is done on the Internet.

The effectiveness of advertising is usually less than it could be, due to the lack of personalization and the addressing of an undefined group of people by the advertising. Producers therefore strive to single out individual groups from the entire collection of users and present to each group its own advertising, calculated for that group. This is known as targeted advertising. Targeted advertising is advertising statements (presentations) connected not to the content of a web page, but to a particular group of users, identified on the basis of their previous behavior or survey data. Known approaches to adaptive runtime advertisements show advertising messages based on an analysis of search queries, profiles, data from network applications of users, and so forth. But in this case, the advertising is oriented not to the actual user demand, but to the probability of such a demand. As a result, the kinds of advertising statements are significantly less than the number of consumers of the product or service.

During the course of the development of the Internet, the methods of delivering advertising to the user have themselves changed. The user encounters advertising not only during surfing, but also in applications having access to the network and to the information boards on the way to work or home. Advertising has one major shortcoming: oftentimes it annoys the user, who does not need the product being advertised, and therefore the user seeks to avoid applications and web resources with advertising. If the user in fact needs the product, but the advertising is too intrusive, this may redirect the user to a competitor.

Thus, the existing advertising products have a low efficiency, and they gather and transmit information about the user and engage in profiling, which may entail legal risks. Advertising annoys the user, and he or she will seek to avoid applications with advertising, which is critical to them, since the application is monetized through advertising.

SUMMARY

Aspects of the present disclosure are configured to determine products allowing a condition to be stabilized or brought to a required state.

Systems and methods are provided for detecting system anomalies. The described technique includes receiving system parameters specifying functionality of a computing system. An anomaly is detected within the computing system. A recovery method is determined based on a recovery-method model and information about the detected anomaly, responsive to detecting the anomaly in the computing system. The determined recovery method is configured to ensure requirements of the computing system are met. Furthermore, responsive to detecting the anomaly in the computing system, the determined recovery method is implemented in response to installation of the selected system-compatible tool.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
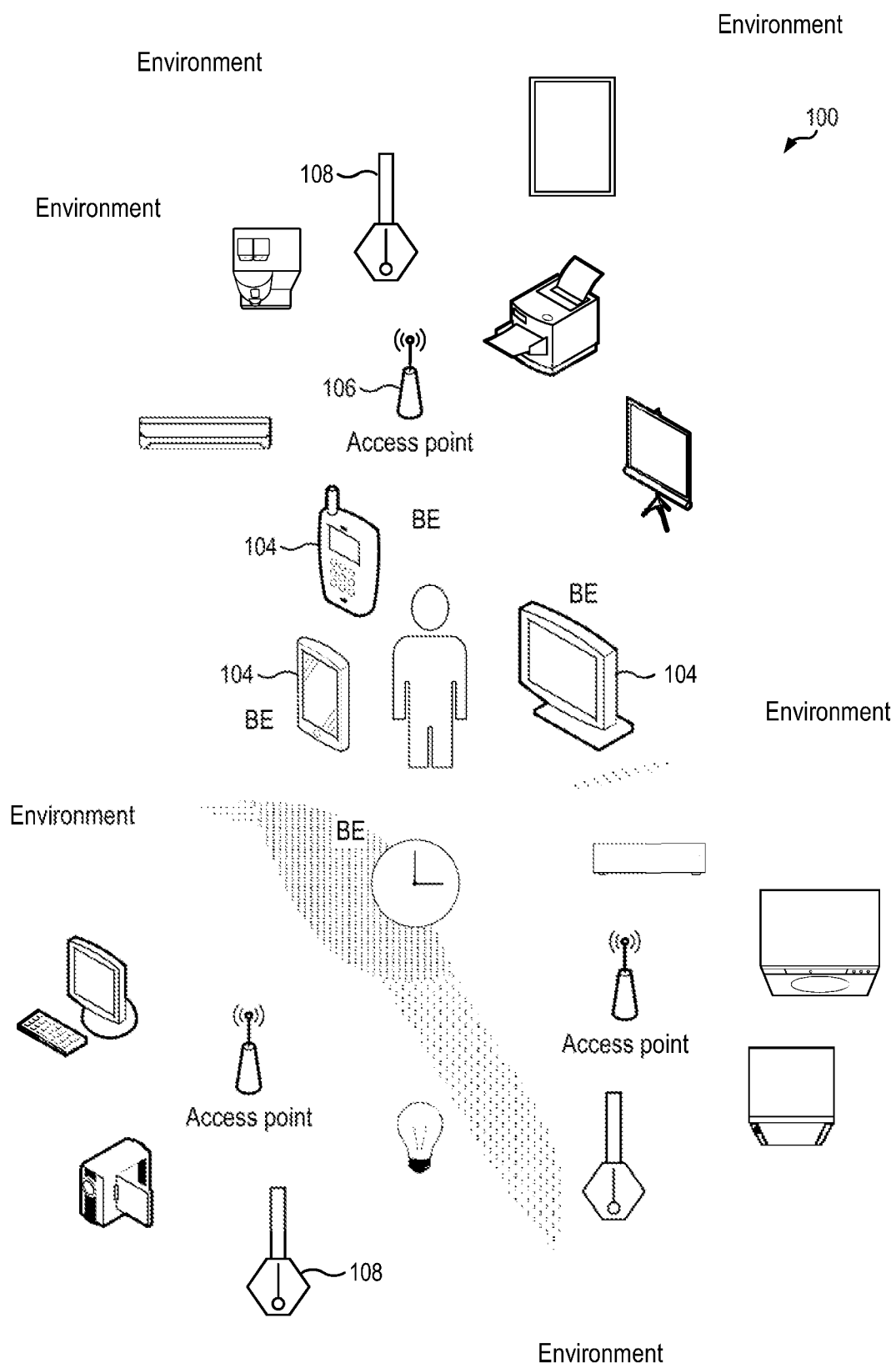
FIG. 1 shows a variant of an observable dynamic system.

The technical result of the present disclosure is to identify third-party modules compatible with a system as a result of carrying out a method of detecting compatible modules, in which system parameters are obtained from elements realizing the functionality of the system and the parameters so obtained are used to interrogate a state model of the system (in a particular instance, a correspondence between the gathered parameters and the possible states of the system is established during the interrogation). The parameters can be obtained in real time, or the parameters are obtained by a client installed on one of the elements of the system (the base element). The elements of the system may be software, hardware, hardware/software, and organisms. The base elements in one particular instance may be personal computer devices which interact with IoT devices in the context of the system. In one particular instance, the system whose parameters are being obtained is dynamic and consists of elements unified by a wireless network, the number of elements connected to the base element being determined by the moment in time and the position in space of the base element and depending on the radius of the zone of coverage of the wireless station providing access to the current wireless network. By interrogating the state model, the correspondence between the requirements of the states and processes in the system and in its elements is assessed. The model may constitute a set of rules for detecting:

- an anomalous state of the element, one which is a function of the parameters of the element;
- an anomalous state of the system, one which is a function of the parameters determining anomalous states of the elements of the system;
- an anomalous process of the element, one which is a time function of the state of the element;
- an anomalous process of the system, one which is a time function of the state of the system.

In another instance, the state model of the system is an aggregate of models of usage and reliability variants.

As a result of the interrogation of the model, the anomaly is detected and the system parameters may be also identified of which the anomaly is a function, where the anomaly may be at least:

- a state of an element deviating from the required state and being a function of the parameters of the element;
- a state of the system deviating from the required state and being a function of the state of an element;
- a process of an element deviating from the required one and being a time function of the state of the element;
- a process of the system deviating from the required one and being a time function of the state of the system;
- a state of the environment with which the system is interacting, deviating from the required state and describable by the parameters of the system;
- a process of the environment with which the system is interacting, deviating from the required one and describable by the parameters of the system.

The anomaly may be additionally described, for example, by a class or element of the system whose parameters define the anomaly. The anomaly so detected may relate to anomalies of functioning, where the anomaly of functioning is a lowering or loss of the ability of the system or an element of the system to perform a predetermined function.

After detecting the anomaly, a model for recovery methods is examined using information about the detected anomaly and a recovery method is determined as a result of the model examination, where a specific recovery method ensures that the system and elements meet the requirements. In a particular case, the examination of the model includes determination of correspondence between anomalies and recovery methods. In another case, the recovery of the system ensures compliance with the system design requirements. Recovery can also be accomplished by stabilizing the abnormal state or process. In the case when an anomaly is detected in operation, a method is determined as a result of a model examination, which, when implemented, ensures the recovery of the required system functioning when an anomaly arises. The detected method, when implemented, performs recovery due to transition of the element or system from the anomalous state or process to the required one (elimination of the anomaly). In the particular case, the required state or process is compliance with the requirements for the system according to the classification of FURPS+(i.e., "FURPS Plus"). In the case when certain methods at least two select the element for such a method that corresponds to the user profile. The recovery method model may refer to descriptive models.

After determining the recovery method, a third-party, system-compatible tool is defined that can implement this recovery method. The tool can be selected from the tool database in which the recovery method is the name of the table. The correspondence between the recovery methods and the recovery module for the subsequent selection can be carried out when preparing the specification for the module, and the correspondence itself is established by entering information about the facility in a table whose properties correspond to anomalies. In the case that at least two modules are determined, the module is chosen depending on the user profile or the reputation of the manufacturer of the module or the reputation of the supplier of the module.

The present disclosure abandons the random nature of advertising, and advertising messages are transformed into a notification of the user as to a problem and the most effective methods for its solution. Aspects of the present disclosure allow one to avoid the indeterminacy and probability, so that the present proposal cannot be considered an advertising, and instead it is a preventive system of user notification, which inter alia reduces the resources spent on providing the information, such that it is carried out for those who actually need it. The advertising products determine the user preferences and probable needs, and send information to the user about the product or service which may be of interest to them, and which the user might need. The present disclosure conducts a monitoring of the user's environment, discovers an actual problem (or its imminent occurrence) and an actual need, provides information about this, and proposes a possible solution which may be implemented, including the acquisition of certain products or services.

The average user is not able to foresee many technical problems with devices; such a user does not have sufficient technical familiarity to assess the characteristics of a product in order to solve a problem which is occurring or has occurred, yet this information is in possession of the manufacturer. However, the manufacturer does not know the user who is in need of the product, and therefore is forced to carry out market research by probabilistic and statistical methods, and construct a survey model. The present disclosure is able to detect problems with a device and in its environment (including the Internet of Things, or IoT), and is able to find an effective preventive solution of the problem. This system does not require the installing of additional modules, but rather is realized by the actual clients, for example, an antivirus software.

The present solution may be used at least to promote: electronics, information technology (IT) providers, IT services, medical products, healthcare providers, health product and service promotion, labor market products and services, repair and construction materials and services, cleaning services, and food products.

A system is a collection of elements in relation and connection with each other, forming a definite whole or unity. It is a set of elements which are interacting by design, in which an element of the system may be another system, known as a subsystem; the system may be a controlling system or a controlled system and it may include hardware (e.g., devices), software (e.g., programs) and interaction with humans (thus, a human may be an element of the system) or with another biological organism. The elements are unified in such a way as to perform an overall functional task. By design, requirements are placed on the system (e.g., per the classification FURPS+):

- functionality or functional requirements: properties, capabilities, security. These are the primary requirements used to construct the use case diagram.

usability or requirements on usage convenience (UX): the human factor, esthetics, consistency, documentation.

reliability or requirements on dependability: the frequency of possible crashes, fault resistance, restorability, predictability of stability.

performance or requirements on the productivity: response time, resource use, effectiveness, power, scalability.

supportability or requirements on support: possibility of support, reparability, flexibility, modifiability, modularity, expandability, possibility of localization.

A system realized in accordance with a design should meet the design requirements during its functioning. A particular instance of requirements is the performance which the system/element should provide at a given time (for example, requirements on FPS or 100 requests per second from at least 10 users).

The state of an element of the system is the set of attributes of an element of the system at a given time, being a function of the parameters of the element.

The state of the system is the set of attributes of the system at a given time, being a function of the parameters of the system. It is also defined as the aggregate of states of the elements of the system at a given time.

A process is a change in the attributes of an element of the system or those of the entire system in an interval of time, being a time function of the state.

A parameter (of an element, system, or process) is a quantity characterizing a particular attribute of a process, phenomenon, element (including a device, software, organism) or system. Quantitatively, any given system is described by an aggregate of quantities which can be broken down into two classes: parameters (H), describing primary attributes of the system and being the initial data for the investigation of the system; and characteristics (X), describing secondary attributes of the system and being determined as a function of the parameters of the system: X=f(π). The parameters of the system are subdivided into internal parameters of the system, which describe the structural and functional organization of the system, and external parameters of the system, describing the interaction of the system with the environment (in relation to the system). The internal parameters include: structural parameters, describing the makeup of elements of the system and its actual structure; and functional parameters, describing the functional organization (the process of functioning) of the system. The external parameters include, for example, workload parameters, indicating how often the resources of the system are used and in what volume. In the general case, these are parameters of the interaction of the system with its environment.

The characteristics of the system are divided into global characteristics, showing the effectiveness of functioning of the system as a whole; and local characteristics, describing the quality of functioning of individual elements of the system. The global characteristics of the system may include: power characteristics or productivity characteristics, showing the speed of attaining the desired purpose of the system; time characteristics, describing the time aspects of the functioning of the system; reliability characteristics, defining the reliability of functioning of the system; and economic characteristics in the form of cost indicators, showing the economic feasibility of the use of the system.

It is clear from what is described above that one distinguishes a parameter and a characteristic in practice. A characteristic is a function of at least one parameter. In the present application, we shall not distinguish parameters and characteristics, using the term "parameter" for the former and the latter.

An anomaly is a deviation from the requirements. The requirements may be design requirements, for example, for hardware/software complexes, or public health requirements. Deviations from the requirements may be states or processes. Accordingly, one distinguishes anomalous states and processes. A particular instance of an anomalous process is a gradual failure, while anomalous states are a sudden failure or crash. Anomalies may be caused by a deviation from requirements of at least one parameter, that parameter also being an anomaly, or anomalous parameter.

A model is an abstract representation of reality in a particular form (for example, in mathematical, physical, symbolic, graphic or descriptive form), configured to represent certain aspects of that reality and able to produce responses to questions being studied. A model may describe states, processes, anomalies (anomalous states, processes, and parameters), the skilled person (user), and products (devices, software, services). The form may be expressed by using templates, conventional expressions, rules (mapping of an input onto an output), neural nets, decision trees, and so forth.

A dynamic system is a system the number of whose elements is not constant but determined by the position in space of an element, taken as a reference point (base element), and at a moment of time. For example, a dynamic system is one which consists of elements (realized in the form of hardware/software) unified by a wireless network, the number of elements connected to the base element being determined by the moment of time and the position in space of the base element and depending on the radius of the coverage zone of the wireless station providing access to the current wireless network. An example of a dynamic system 100 is shown in FIG. 1, which shall be described below.

Figure 2A:
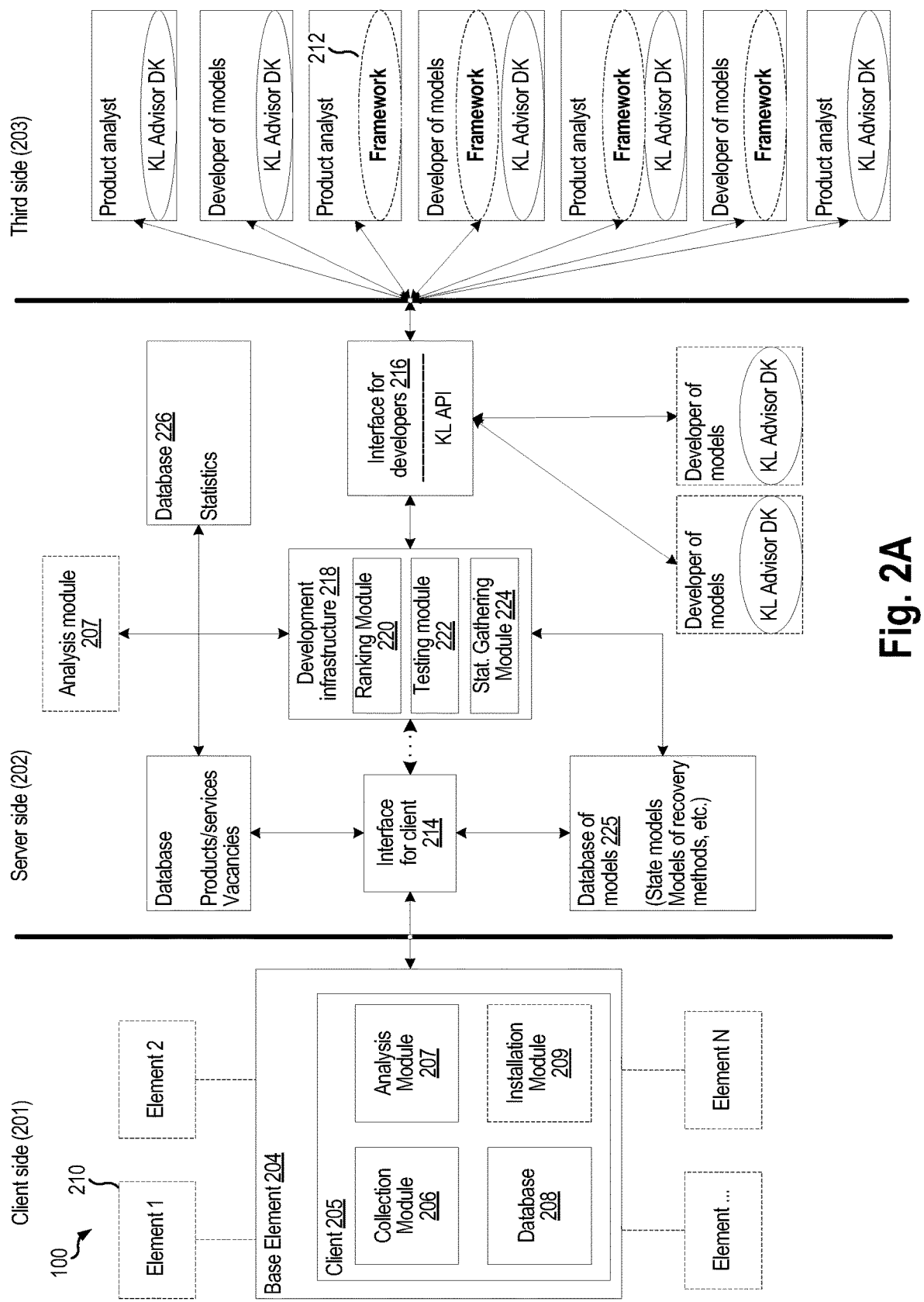
FIG. 2A shows a system of preventive interaction with a user.

FIG. 2A shows a system 200 of preventive interaction with a user. The system 200 includes a client side 201, a server side 203, and a third side 203. At the client side is situated the system 100 being observed, which includes at least one element 210 of the system with an installed client 205 (a base element 204), where the client 205 may be configured to collect the parameters of the system and to interact with the server side. At the third side is situated software/hardware for the development of models, product descriptions/specifications, and so forth. The server side interacts with the client 205 and obtains the developed models from the third side. At the server side, there occurs a testing of the obtained models, a ranking of them, a gathering of statistics on the clients, the generating of configuration files and their updating for the clients, and the providing of an infrastructure for the development of the models.

The client 205 includes a collection module 206, an analysis module 207, and a database 208. Optionally, the client may include an installation module 209. The collection module 206 may be configured to gather the parameters of the system 100, telemetry in one particular instance. The analysis module 207 transforms the parameters into states and processes and analyzes the parameters, states, and processes to discover anomalies. The analysis by the analysis module 207 is done by a module of interrogating the models, for example, the state models. This module 207 also analyzes the anomalies to determine methods of recovery, and discovers modules which allow the recovery method to be carried out, for which the models are also interrogated. The analysis module 207 may optionally be situated at the server side. The installation module 209 may be configured to implement software which realizes the recovery method. The database 208 stores the parameters and states, making it possible to obtain information by the analysis module 207 as to the processes in the elements and in the system, since a process is a change in the states over time.

At the third side, the development modules create descriptions of products (including services), generate models, and send the results to the server side. The development module may include a framework 212 and other software to formalize a description of products which is easily understood by a human being in a format supported by the modules on the server and client side, and also to generate models, including those based on the formalized descriptions, and to send the result to the server side.

The server side provides an interface 214 for communication with the client side and the third-party development modules (216). A development infrastructure 218 is realized at the server side which includes at least: a ranking module 220, a testing module 222, and a statistics gathering module 224.

The ranking module 220 may be configured to determine the models which will be sent to the specific client and which will be interrogated by the analysis module 207. The testing module 222 may be configured to check the new models obtained from the development modules. The models are kept in a models database 225. The statistics gathering module 224 receives data from clients according to the collected parameters, the models interrogated, and the results of the interrogation of the models, and generates statistics which are kept in a statistics database 226. The accumulated statistics are used to develop new models, debug existing ones, and so forth, and are accessible across an interface to the developer.

FIG. 1 shows a variant of a dynamic system 100 being observed by one or more sensors 108, the core of which is a base element (BE) 104 (similar to the base elements of FIG. 2A) on which a client is installed. The base elements 104 may be notebooks, smart watches, smartphones, personal computers, and so on. The base element 104 is linked to other elements in the example via an access point 106. Thus, the number of elements of the system is determined by the radius of action of the access point 106 in whose coverage area the base element is found. In the context of the given system 100, in a particular instance a human being may be considered to be an element of the system in the capacity of an object or subject of control/diagnostics/monitoring. In the case when the human being is considered to be an object of control/diagnostics/monitoring (for example, the recording of a cardiogram), the other elements of the system are subjects of control. The concept of an anomaly in the context of a human being as an element of the system may be defined as a deviation from the normal states of processes in the context of medical requirements.

In another case, a human being as well as the environment are considered as being objects of control/diagnostics/monitoring, yet now they are external with respect to the system 100. In a given case, the elements of the system collect parameters, being external in accordance with the indicated classification, and on the basis of these parameters the states and processes of the object of control/diagnostics/monitoring are determined, while the methods of recovery will be determined with respect to the object of control/diagnostics/monitoring, which may be either a human being or the environment.

Figure 2B:
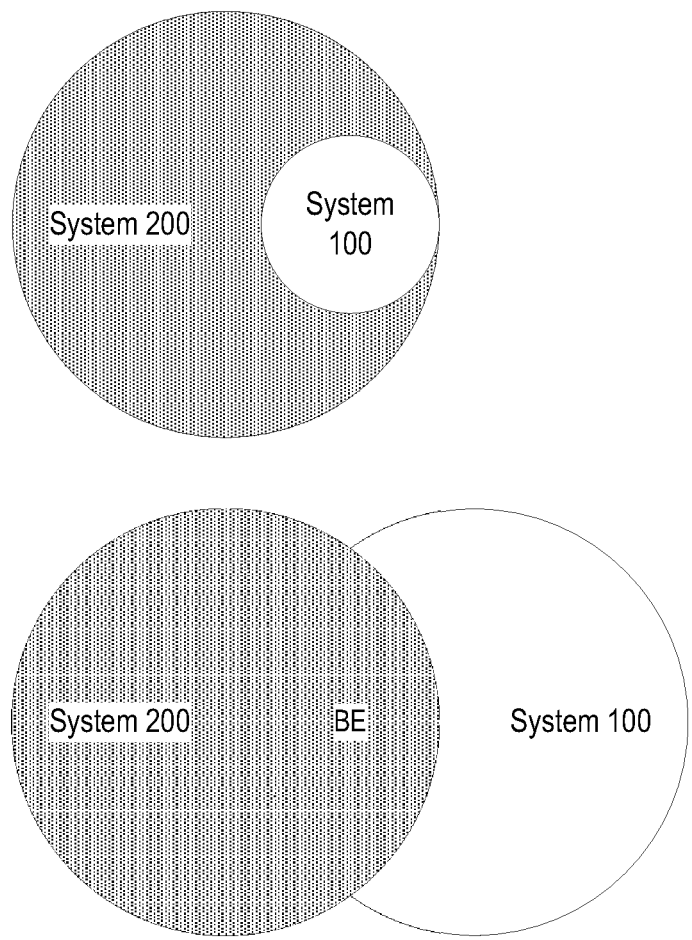
FIG. 2B shows the relations between the system of preventive interaction with a user and the observable dynamic system.

The relations of the system 200 and the observable dynamic system 100 are discussed in FIG. 2B. The dynamic system 100 may be either a subsystem of the system 200 or intersect element by element with the system 200, for example, the base element 104 may be the general portion of the system 200 and a portion of the system 100 (as is shown in FIG. 2B).

Figure 3A:
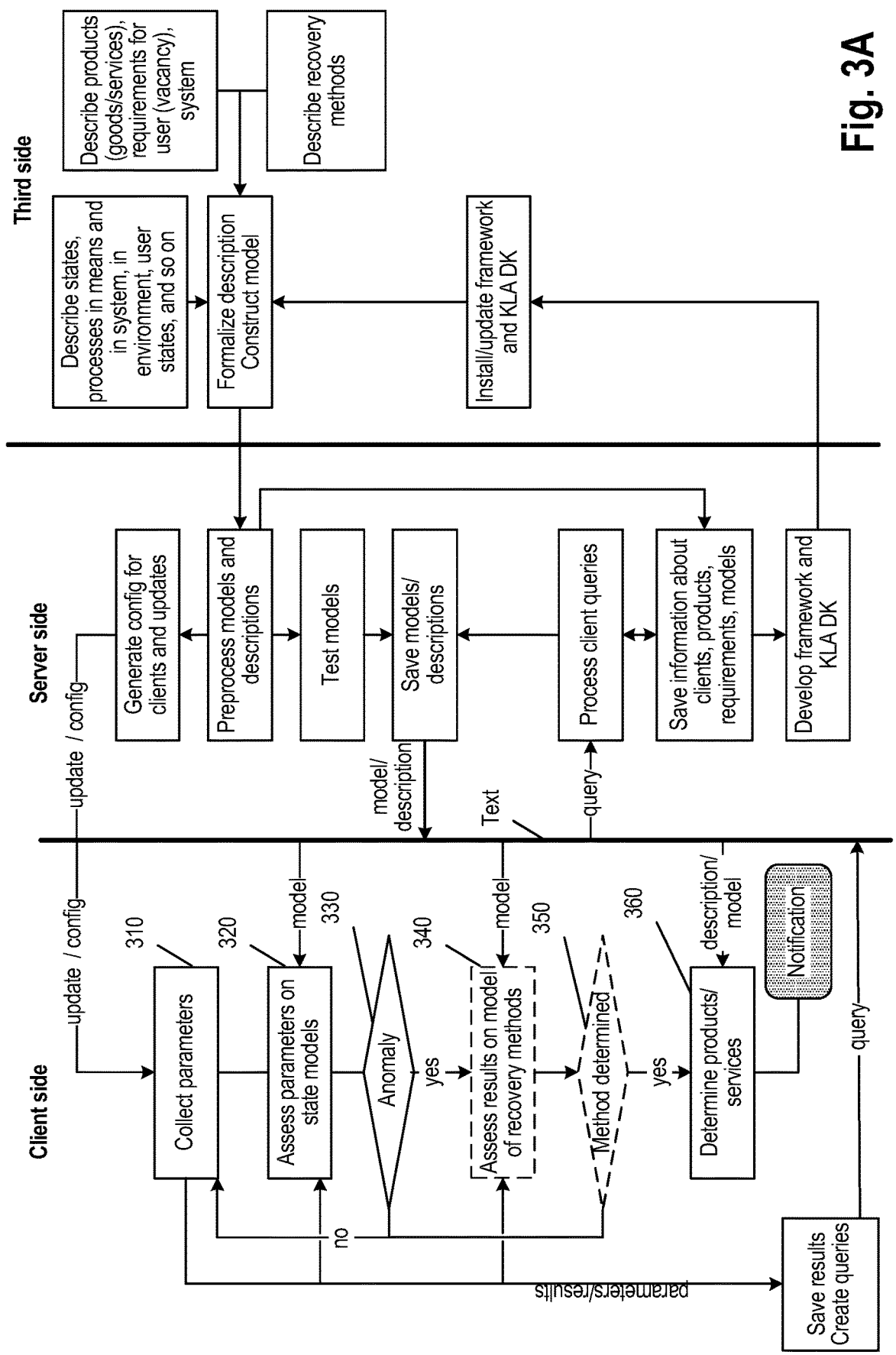
FIG. 3A shows the method of determining compatible modules for systems with anomalies.

The system 200 may be configured to implement the method of selecting compatible modules for systems with anomalies (see FIG. 3A), where the collection module 206 of the client 205 in step 310 collects the parameters of the system 100 from the elements realizing the specified functionality of this system 100. The gathering may also be done in real time. The gathered parameters are saved in the client database and in step 320 the gathered parameters are used by the analysis module 207 of the client 205 to interrogate the state models of the system. The analysis module 207, in interrogating the state models, assesses the conformity of the state of the system 100 and its elements to the requirements for the system. The state models may describe as normal the processes and states conforming to the required ones, and as anomalous those for example describing a fault state or failure process. The state models may be kept in the client database 208. In another particular instance, the state models are presented by the server side to the analysis module of the client on demand. The models describing the states may be as diverse as possible: regression, classification, categorization and other models. The models describing the states may be based on decision making trees, neural nets, or logic rules of the type IF (or/and/xor) THEN, and so forth.

In step 330, as a result of the interrogation of the models an anomaly is detected in the system. The anomaly may be at least: a state of an element deviating from the required state and being a function of the parameters of the element; a state of the system deviating from the required state and being a function of the state of an element; a process of an element deviating from the required one and being a time function of the state of the element; a process of the system deviating from the required one and being a time function of the state of the system; a state of the environment with which the system is interacting, deviating from the required state and describable by the parameters of the system; and a process of the environment with which the system is interacting, deviating from the required one and describable by the parameters of the system.

After discovering an anomaly, information about the discovered anomaly is formalized for further processing, where it may be characterized by the class (and/or name) of the anomaly and the system parameters of which the anomaly is a function. In addition, the element of the system whose parameters determine the anomaly may be indicated as a characteristic. The class and name of the anomaly depend on which requirements are being deviated from. Examples of anomalies may be: weak signal of a router, degradation in performance of an element (CPU, HDD, SSD, RAM and so on), insufficient RAM space, data loss/corruption, and so forth. If the anomaly involves a gradual failure, the anomaly is not the actual loss of data or shortage of memory volume which is determined, but rather the imminent occurrence thereof. In a particular instance, the anomaly has the Functionality class (in the FURPS+ classification) and involves, for example, the functioning of the system, where the functioning anomaly is a lowering or loss of the ability of the system or element of the system to perform a function dictated by its design or purpose.

Having detected an anomaly in step 340, and using the information about the anomaly, the model of the methods of recovery is interrogated. There may be different models of methods of recovery, as well as state models; in a particular instance, descriptive models are used. Furthermore, as a result of the interrogation of the models, in step 350 the method of recovery is determined which, when implemented, will ensure a conformity of the system and the elements to the requirements, for example, it will ensure the recovery of the required functioning of the system. The method of recovery so discovered can both stabilize the anomalous state or process (halt the development of the anomaly, which is useful for gradual failures) and bring about a recovery of the system by switching the element or system from the anomalous state or process to the required one (elimination of the anomaly), where the required state or process conforms to the requirements for the system by the FURPS+ classification. There can be more than one detected recovery method, in which case the definitive method is chosen on the basis of the user's profile of the base element, which may involve various characteristics: gender, age, location, marketing class, purchasing power (solvency), level of IT literacy, and so forth.

In the step 360, a third-party compatible module is selected (in one instance, the method may select not a module, but a product) realizing the functionality of the recovery method found as a result of the interrogation of the model of recovery methods. Both models and databases may be used for this, in which the name of the recovery method corresponds to modules which are guaranteed to realize the recovery method. As for the recovery methods, there may be more than one available recovery module, in which case the modules are chosen based on the user's profile; in addition, the reputation of the manufacturer (vendor) of the recovery module may be taken into account. The selected module can be implemented by various methods in the system, one such method for software being the installation thereof by the client's installation module. Compatibility is determined on the basis of an analysis of the specification of the system or module.

In a particular instance, the recovery methods might not be determined (skipping steps 340 and 350) and the module will be determined on the basis of information about the anomaly. In this case, after performing step 330 there is a jump to step 360.

Figure 3B:
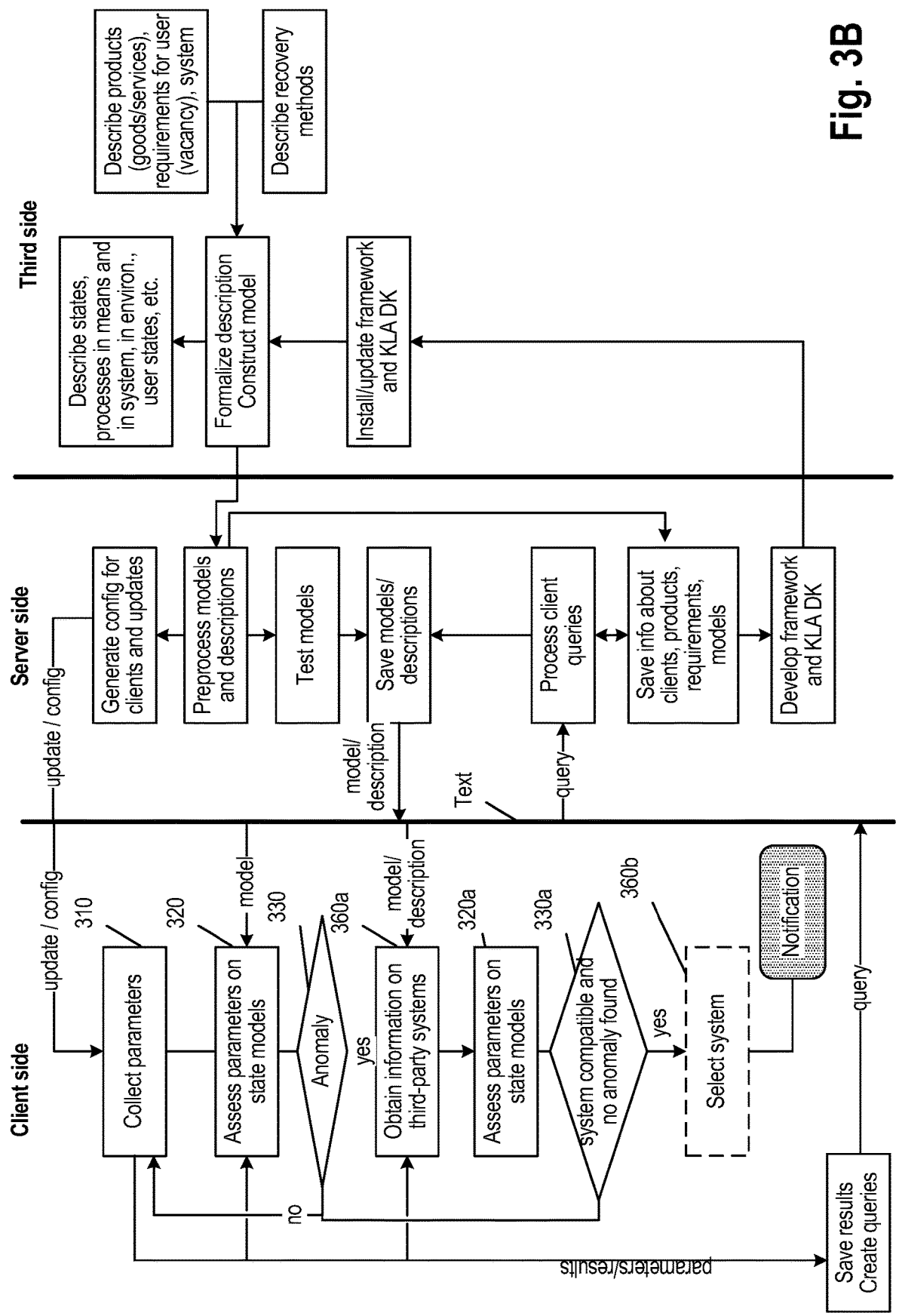
FIG. 3B shows the method of detecting compatible modules.

The above-described method may be carried out otherwise by the system 200 (see FIG. 3B). The steps from 310 to 330 repeat the method described above, but then divergences begin. After detecting the anomaly which is characterized at least by parameters of the elements or system of which it is a function, in step 340*a* a database of available third-party systems or modules or information about at least one module is obtained. Next, in step 320*a*, once again the state model of the system is interrogated using the set of parameters collected in step 310, but in this set the parameters of the system of which the anomaly is a function are replaced by equivalent parameters of the module from the database of available third-party modules. On the basis of an interrogation of the state model in step 330*a*, at least one module is found in the database of third-party module which: is compatible with the system; and no anomaly is found when interrogating the state model with the use of the replacement parameters of that module.

In step 330*a,* more than one module meeting the indicated criteria may be found; in that case, of the module found there is selected one module in step 360*b* in one particular instance, for example based on the user's profile of the base element and/or the reputation of the manufacturers/providers of the module found. In another particular instance, the user is notified about all module discovered (the list may be first ranked). The chosen module may be installed either in place of or in addition to the module realizing the element of the system whose parameters determine the anomaly.

Figure 4:
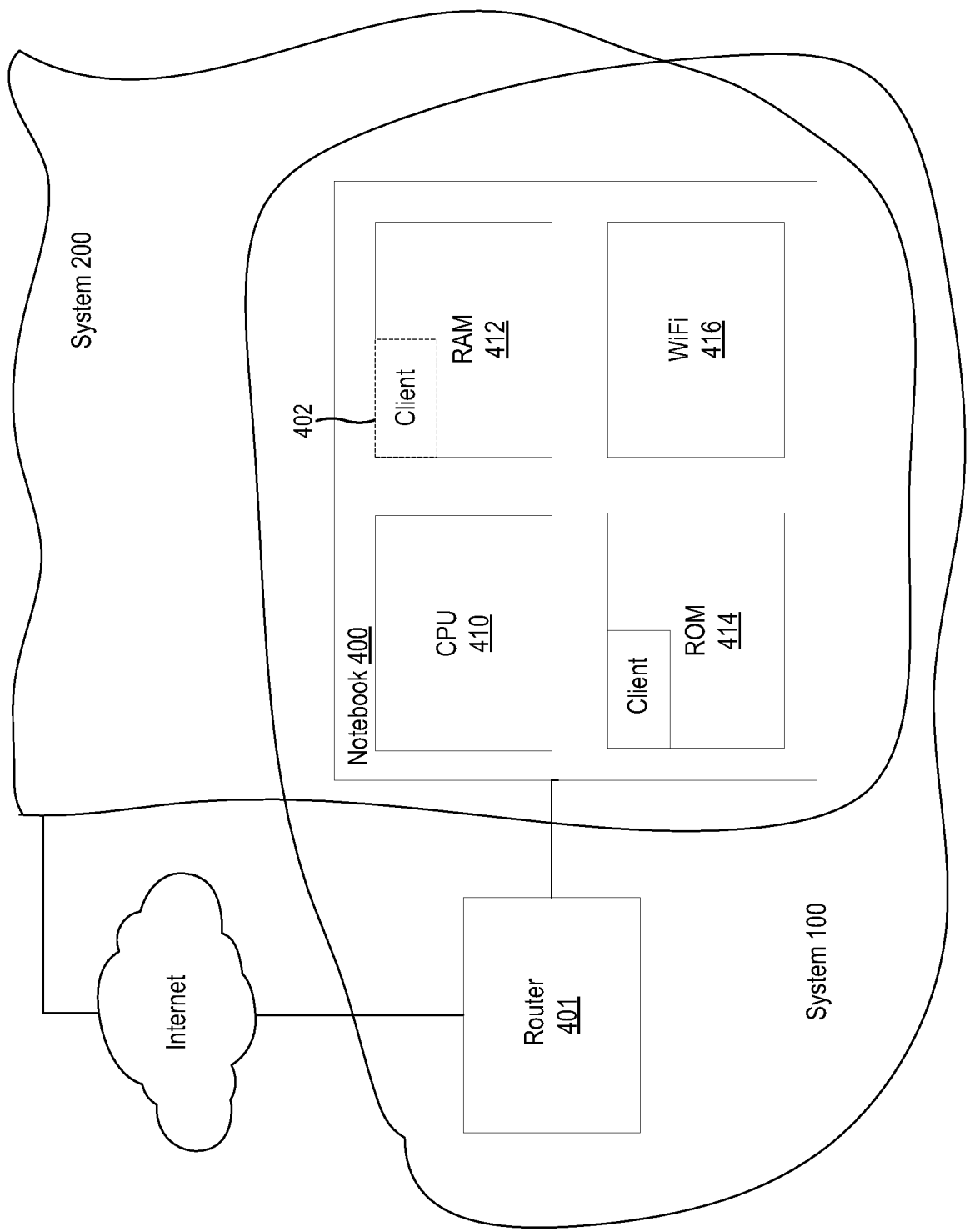
FIG. 4 shows an exemplary embodiment of the present disclosure.

For better understanding, let us consider a simplified example (FIG. 4). The client 402 (client software) is installed on a notebook 400, which in turn is connected to a router 401. In the terms of the present disclosure, the notebook is the base element and forms, together with the other element, or router 401, the system being investigated. In turn, the base element itself consists of elements, so that the notebook in the context of the investigated system is a subsystem. The client 402 gathers the parameters of the system and the elements, where the elements are at least the central processor unit 410, the RAM 412, a nonvolatile storage device (NVRAM) 414, a wireless communications module 416, and a router 401. In the present example, the NVRAM is realized by a solid state drive (SSD), while the router 401 is realized by an external router with WPA2 software encryption. The client 402 gathers the following parameters: S.M.A.R.T. (Self-monitoring, Analysis, and Reporting Technology) attributes of the NVRAM (such as the Reallocated Sector Count); data on the traffic encryption (e.g., yes/no, type of encryption); the traffic volume in both directions, the traffic density (volume per unit of time); the channel speed; the router signal power; and the specification of the module, such as NVRAM (type (Type), volume (Value), form factor (FF), interface (Interface)); and router (Wi-Fi (IEEE) standard, frequency range of Wi-Fi devices (Spectr), hardware encryption support (HBE)).

Table 1 is presented below, aggregating the parameters which are gathered. From this, one may obtain the state at a given time Sn, as well as the process $S_n \rightarrow SS_{n+1} \rightarrow \ldots S_n + \ldots$

TABLE 1

| State | $S_1$ | $S_2$ | $S_3$ | $S_4$ | $S_5$ | $S_6$ | $S_7$ | $S_8$ | $S_9$ |
|---|---|---|---|---|---|---|---|---|---|
| SMART attribute 05, RSC | 3 | 3 | 3 | 4 | 4 | 5 | 6 | 8 | 25 |
| Encryption Enc | 1 WEP | 1 WEP | 1 WPA2 | 1 WPA2 | 1 WPA2 | 1 WEP | 1 WEP | 1 WEP | 1 WEP |
| Speed V, Mbit/s | 80 | 82 | 10 | 10 | 10 | 60 | 70 | 80 | 78 |
| Signal P, dBm | 20 | 18 | 20 | 16 | 10 | 11 | 9 | 20 | 18 |
| Time periods T | 1 | 2 | 3 | 4 | 5 | 6 | 7 | 8 | 9 |

The collected parameters are used by the client's analysis module 207 to interrogate the state models of the system. The analysis module 207, in interrogating the state models, assesses the conformity of the state of the system 100 and its elements to the requirements for the system. In the example, simple logical models are used, which describe anomalous states of the elements, as follows.

For example, the state model may specify that, if the channel speed in a given state ($V_n$) is significantly less than a threshold speed Vk, or significantly greater than the threshold $V_k$, then the anomalous state SPEED_DEGR is used that describes the state of degradation of the network channel (i.e., IF $V_n \ll V_k$ or $V_n \gg V_k$ THEN SPEED_DEGR).

In one example, the state model may specify that if the reallocated sectors count at a given state ($RSC_n$) is less than a threshold count $RSC_k$ and less than the reallocated sectors count in a second state ($RSC_m$), then the anomalous state NVRAM_Sector_DEGR is used that describes the degradation of the NVRAM in the form of a gradual failure of the disk surface, as indicated by an increase in the number of sector reassignment operations, testifying to wear on the surface (i.e., IF $RSC_n < RSC_k < RSC_m$ WHERE $T_n < T_k < T_m$ THEN NVRAM_Sector_DEGR).

In another example, the state model may specify that if the reallocated sectors count is greater than 20, then the anomalous state NVRAM_FAULT is used that describes a failure of the NVRAM due to reaching a critical value of reassigned sectors equal to 20 (i.e., IF RSC>20 THEN NVRAM_FAULT).

In another example, in response to determining that the signal power at a given state ($P_n$) is greater than a threshold signal power value and a signal power at another state ($P_m$), and the signal power of the second state is less than 15 dBm, the anomalous state POWER DEGR is used that describes the state of degradation of the signal power, indicating a drop in the signal level over time to a critical level of 15 dBm (i.e., IF $P_n > P_k > P_m$ and $P_m < 15$ WHERE $T_n < T_k < T_m$ THEN POWER_DEGR).

As a result of the interrogation of the above-described models, the client discovers anomalies at certain moments of time as follows: degradation of the network channel at time $T_3$; degradation of the NVRAM at time $T_6$; failure of the NVRAM at time $T_9$; and degradation of the signal power at time $T_5$.

The degradations are anomalous processes, and the failure is an anomalous state. Having information about an anomaly, the models of recovery methods are interrogated (which for this example are also expressed by logical models) and recovery methods are determined as follows:

IF POWER_DEGR THEN AREA_EXTEND—to recover the signal power, it is recommended to extend the radius of effective coverage of the router;

IF SPEED_DEGR WHERE $ENC_n=1$ and $HBE^i=0$ THEN HBE—to recover the speed of the connection, it is recommended to provide hardware encryption support;

IF SSD_FAULT THEN NVRAM_CHANGE—the failure of the NVRAM should be overcome by replacing the module whereby the element is realized, in the present example by replacing the SSD;

IF ROM_Sector_DEGR THEN NVRAM_CHANGE or BACKUP—having identified degradation of the surface when the module realizing the element is still operational, it is recommended to consider replacing the module and arranging for a backup copying Having determined the recovery methods, the module capable of realizing the recommended recovery method are determined. In our example, this is done by a query to the database 227, in which tables are designated in accordance with the recovery methods. That module will be chosen which not only realizes the recommended method, but is also compatible with the system in question, for which purpose the query includes certain conditions (the operator WHERE) formed on the basis of the parameters of the system in question. The results of performing the queries are presented together with the queries themselves:

SELECT*FROM AREA_EXTEND WHERE Spectr='2, 4' and IEEE='802.11n' and MaxV>80
ZYXEL WRE2206
Tenda A300
NETGEAR EX2700
ASUS RP-AC51
SELECT*FROM HBE WHERE Spectr='2,4' and IEEE='802.11n' and MaxV_WPA2>80
ZYXEL NBG-418N v2
DSL-N16U
MikroTik hAP mini
SELECT*FROM NVRAM_CHANGE WHERE Type='SSD' and FF='M.2', and Interface='PCIe3.0' and Value>128
Intel 600p
Patriot Hellfire
Samsung 960 EVO
SELECT*FROM BACKUP WHERE Type='Remote' and Value>128 and (Trial='Yes' or Free='Yes') and Period='Day' and Scheme='Incremental'
Acronis Disk Director 12
Veeam Agent Free More than one module has been found. Additional filters will then be applied to the module so found, taking into account additional characteristics, such as financial solvency of the user, level of IT literacy of the user (not all modules are easy to install), willingness of the user to call in a specialist, popularity of the solution among consumers, reputation of the manufacturer/supplier, and so forth.

In a particular instance, the model of recovery methods might not be interrogated, for example, upon triggering of the model: IF RSC>20 THEN NVRAM_FAULT describes a failure of the NVRAM due to reaching a critical value of reassigned sectors equal to 20.

A query can be made to a database of modules, where the table attributes correspond not to recovery methods, as in the above example, but to anomalies:

SELECT*FROM NVRAM_FAULT WHERE Type='SSD' and FF='M.2', and Interface='PCIe3.0' and Value>128 when carrying out the method described in FIG. 3B, after detecting the anomaly:

IF RSC>20 THEN NVRAM_FAULT

Information is obtained as to third-party modules compatible with the system 100, such as can realize the system element whose parameters are determining the anomaly:

SELECT*FROM NVRAM WHERE Type='SSD' and FF='M.2', and Interface='PCIe3.0' and Value>128

Among the compatible modules found, that module is selected which the anomaly (RSC>20==False) is not found upon interrogating the state model (IF RSC>20 THEN NVRAM_FAULT) with the use of substitute parameters of the module; obviously, in this example, that module will be any properly working module such that the characteristic of that module is an absence of reassigned sectors, in other words, for such module RSC==0.

By the modules of the system 200 is meant actual devices, systems, components, a group of components, realized with the use of hardware such as integrated microcircuits (application-specific integrated circuit, ASIC) or a field-programmable gate array (FPGA) or, for example, in the form of a combination of software and hardware such as a microprocessor system and a set of program instructions, and also based on neurosynaptic chips. The functionality of the indicated modules may be realized exclusively by hardware, and also in the form of a combination, where some of the functionality is realized by software and some by hardware.

Figure 5:
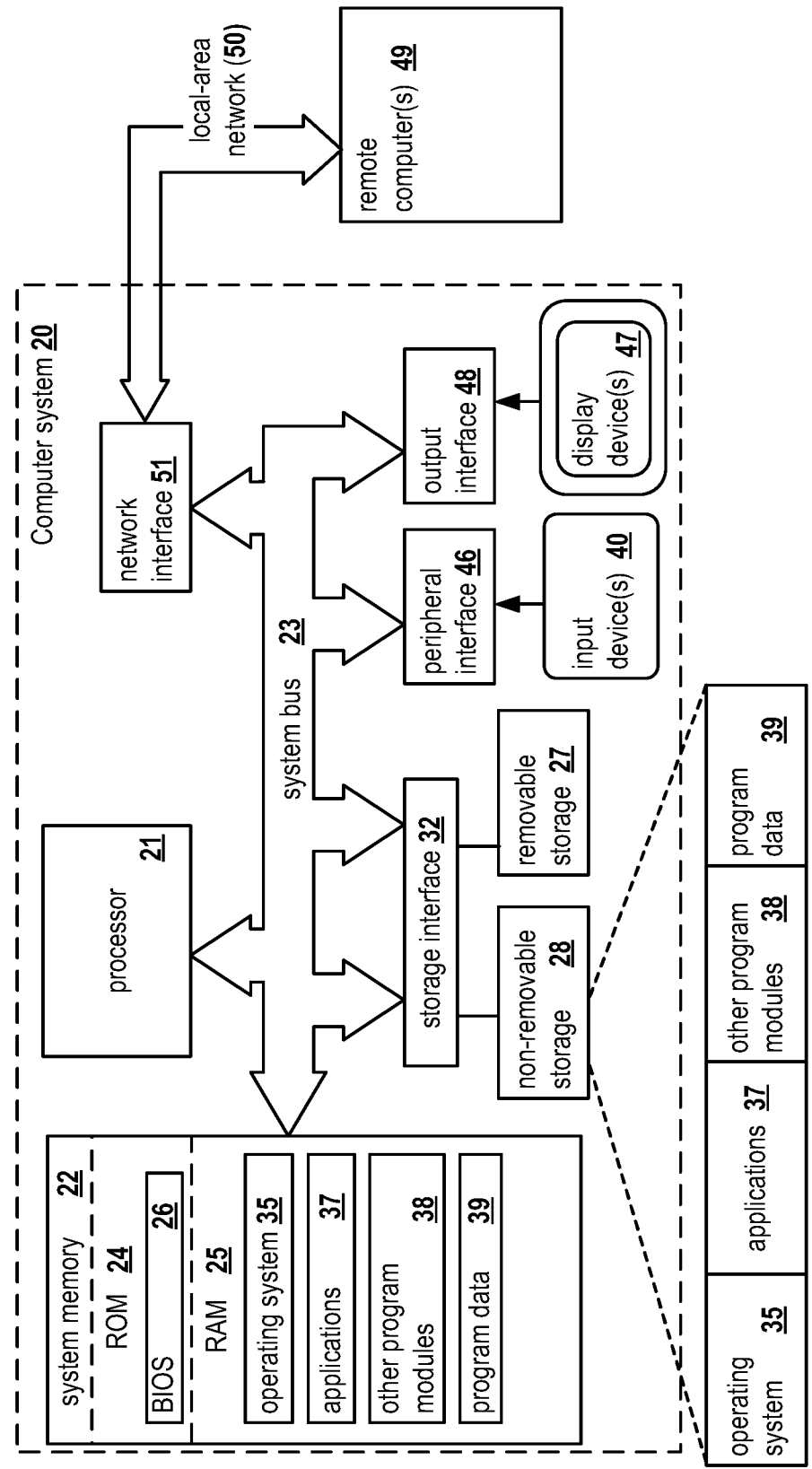
FIG. 5 shows an example of a computer system.

In certain variant embodiments, the module can be implemented on the processor of a computer (such as the one depicted in FIG. 5). The databases may be realized by all possible methods and be contained either on a single physical medium or on various media, situated either locally or remotely.

FIG. 5 is a block diagram illustrating a computer system 20 on which aspects of systems and methods for detecting compatible modules for systems with anomalies may be implemented in accordance with an exemplary aspect. It should be noted that the computer system 20 can correspond to any of the base elements 104, for example, described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, static random access memory (SRAM), dynamic random access memory (DRAM), zero capacitor RAM, twin transistor RAM, enhanced dynamic random access memory (eDRAM), extended data output random access memory (EDO RAM), double data rate random access memory (DDR RAM), electrically erasable programmable read-only memory (EEPROM), NRAM, resistive random access memory (RRAM), silicon-oxide-nitride-silicon (SONOS) based memory, phase-change random access memory (PRAM); flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 5, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A computer-implemented method for detecting system anomalies, comprising:
    receiving system parameters specifying functionality of a computing system having a plurality of elements;
    detecting an anomaly within the computing system by interrogating one or more state models of the computing system, wherien each of the one more state models comprises a set of rules for detecting an anomalous state; and
    responsive to detecting the anomaly in the computing system:
    determining a recovery method based on a recovery-method model and information about the detected anomaly, wherein the determined recovery method is configured to halt development of the detected anomaly and configured to switch at least on of the plurality of elements of the computing system from an anomalous state to a state that conforms to requirements of the computing system;
    selecting, from a tool database, a system-compatible tool configured to implement the determined recovery method, wherein compatibility between the computing system and the tool is determined based on an analysis of a specification of the computing system; and
    implementing the determined recovery method in response to installation of the selected system-compatible tool.

2. The method of claim 1, wherein the detected anomaly comprises at least one of: a state of an element of a plurality of elements deviating from a required state and being a function of the system parameters of the element, a state of the computing system deviating from the required state and being a function of the state of the element, a process of an element of the plurality of elements deviating from the required state and being a time function of the state of the element, a process of the computing system deviating from the required state and being a time function of the state of the computing system, a state of an environment with which the computing system is interacting, is deviating from the required state, and is described by the system parameters, or a process of the environment with which the computing system is interacting, is deviating from the required state, and is described by the system parameters.

3. The method of claim 2, wherein the process of the element of the plurality of elements deviating from the required state comprises a change in attributes of the element of the computing system in an interval of time, and wherein the process of the element is a time function of the state of the computing system.

4. The method of claim 3, wherein the state of the computing system comprises an aggregate of states of the plurality of the elements at a given time.

5. The method of claim 1, wherein each of the one or more state models describes at least: required processes of the computing system, required states of the computing system, fault states of the computing system and failure processes of the computing system.

6. The method of claim 1, wherein determining the recovery method based on the recovery-method model comprises: determining the recovery method based on a correspondence with the detected anomaly within the recovery-method model.

7. The method of claim 1, further comprising:
implementing the determined recovery method using the selected system-compatible tool, wherein the determined recovery method is configured to ensure recovery of the required functioning of the computing system.

8. The method of claim 1, wherein selecting the system-compatible tool comprises querying a table in the tool database, wherein attributes of the table correspond to a plurality of anomalies.

9. A system for detecting system anomalies, comprising:
a memory device storing a state model and a recovery-method model; and
a hardware processor connected to the memory device, wherein the hardware processor is configured to:
receive system parameters specifying functionality of a computing system having a plurality of elements;
detect an anomaly within the computing system by interrogating one or more state models of the computing system, wherein each of the one or more state models comprises a set of rules for detecting an anomalous state; and
responsive to detecting the anomaly in the computing system:
determine a recovery method based on a recovery-method model and information about the detected anomaly, wherein the determined recovery method is configured to halt development of the detected anomaly and configured to switch at least one of the plurality of elements of the computing system from an anomalous state to a state that conforms to requirements of the computing system;
select, from a tool database, a system-compatible tool configured to implement the determined recovery method, wherein compatibility between the computing system and the tool is determined based on an analysis of a specification of the computing system; andd
implement the determined recovery method in response to installation of the selected system-compatible tool.

10. The system of claim 9, wherein the detected anomaly comprises at least one of: a state of an element of a plurality of elements deviating from a required state and being a function of the system parameters of the element, a state of the computing system deviating from the required state and being a function of the state of the element, a process of an element of the plurality of elements deviating from the required state and being a time function of the state of the element, a process of the computing system deviating from the required state and being a time function of the state of the computing system, a state of an environment with which the computing system is interacting, is deviating from the required state, and is described by the system parameters, or a process of the environment with which the computing system is interacting, is deviating from the required state, and is described by the system parameters.

11. The system of claim 10, wherein the process of the element of the plurality of elements deviting from the required state comprises a change in attributes of the element of the computing system in an interval of time, and wherein the process of the element is a time function of the state of the computing system.

12. The system of claim 11, wherein the state of the computing system comprises an aggregate of states of the plurality of elements at a given time.

13. The system of claim 9, wherein each of the one or more state models describes at least: required processes of the computing system, required states of the computing system, fault states of the computing system and failure processes of the computing system.

14. The system of claim 9, wherein the hardware processor configured to determine the recovery method based on the recovery-method model is further configured to: determine the recovery method based on a correspondence with the detected anomaly within the recovery-method model.

15. The system of claim 9, wherein the hardware processor is further configured to: implement the determined recovery method using the selected system-compatible tool, wherein the determined recovery method is configured to ensure recovery of required functioning of the computing system.

16. The system of claim 9, wherein the hardware processor configured to select the system-compatible tool is further configured to query a table in the tool database, wherein attributes of the table correspond to a plurality of anomalies.

17. A non-transitory computer readable medium comprising computer executable instructions for detecting system anomalies, including instructions for:
receiving system parameters specifying functionality of a computing system having a plurality of elements;
detecting an anomaly within the computing system by interrogating one or more state models of the computing system, wherein each of the one or more state models comprises a set of rules for detecting an anomalous state; and
responsive to detecting the anomaly in the computing system:
determining a recovery method based on a recovery-method model and information about the detected anomaly, wherein the determined recovery method is configured to halt development of the detected anomaly and configured to switch at least one or the plurlaity of elements of the computing system from an anomalous state to a state that conforms to requirements of the computing system;
selecting, from a tool database, a system-compatible tool configured to implement the determined recovery method, wherein compatibility between the computing system and the tool is determined based on an analysis of a specification of the computing system; and
implementing the determined recovery method in response to installation of the selected system-compatible tool.

18. The non-transitory computer readable medium of claim 17, wherein the detected anomaly comprises at least one of: a state of an element of a plurality of elements deviating from a required state and being a function of the system parameters of the element, a state of the computing system deviating from the required state and being a function of the state of the element, a process of an element of the plurality of elements deviating from the required state and being a time function of the state of the element, a process of the computing system deviating from the required state and being a time function of the state of the computing system, a state of an environment with which the computing system is interacting, is deviating from the required state, and is described by the system parameters, or a process of the environment with which the computing system is interacting, is deviating from the required state, and is described by the system parameters.

19. The non-transitory computer readable medium of claim 18, wherein the process of the element of the plurality of elements deviating from the required state comprises a change in attributes of the element of the computing system in an interval of time, and wherein the process of the element is a time function of the state of the computing system.

20. The non-transitory computer readable medium of claim 19, wherein the state of the computing system comprises an aggregate of states of the plurality of elements at a given time.

\* \* \* \* \*